(12) United States Patent
Matsuda et al.

(10) Patent No.: US 11,425,023 B2
(45) Date of Patent: Aug. 23, 2022

(54) NETWORK SYSTEM AND CONFIGURATION METHOD THEREFOR

(71) Applicant: Nippon Telegraph and Telephone Corporation, Tokyo (JP)

(72) Inventors: Akira Matsuda, Musashino (JP); Hitoshi Irino, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 42 days.

(21) Appl. No.: 16/969,471

(22) PCT Filed: Feb. 13, 2019

(86) PCT No.: PCT/JP2019/005087
§ 371 (c)(1),
(2) Date: Aug. 12, 2020

(87) PCT Pub. No.: WO2019/159961
PCT Pub. Date: Aug. 22, 2019

(65) Prior Publication Data
US 2021/0014151 A1 Jan. 14, 2021

(30) Foreign Application Priority Data
Feb. 14, 2018 (JP) .............................. JP2018-024147

(51) Int. Cl.
*H04W 88/04* (2009.01)
*H04L 12/715* (2013.01)
*H04L 12/751* (2013.01)
*H04L 45/02* (2022.01)

(52) U.S. Cl.
CPC .............. *H04L 45/04* (2013.01); *H04L 45/02* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2014/0181292 A1* | 6/2014 | Venkataswami | H04L 45/02 709/224 |
| 2018/0041396 A1* | 2/2018 | Li | H04L 41/12 |

OTHER PUBLICATIONS

Lapukhov et al., "Use of BGP for Routing in Large-Scale Data Centers," Internet Engineering Tash Force (IETF), Aug. 2016, 36 pages.

* cited by examiner

*Primary Examiner* — Hong Shao
(74) *Attorney, Agent, or Firm* — Fish & Richardson P.C.

(57) ABSTRACT

A network system in which network relay devices such as switches or routers which reduce the load of VPN path information are connected to a Clos topology and a configuration method thereof are provided. A network system according to the present invention is a network system in which a plurality of network relay devices that are routers or switches are connected by a leaf/spine type Clos topology and which performs path control using BGP. Each of the plurality of network relay devices belongs to an entire AS made up of all of the plurality of network relay devices by BGP confederation, and the respective network relay devices belong to a sub AS. A leaf type network relay device is connected to a spine type network relay device via an eiBGP peer and is connected to the other leaf type network relay devices via as iBGP peer.

6 Claims, 7 Drawing Sheets

Fig. 2

```
COMMAND IMAGE (Leaf#1) :
 router bgp 65501
  bgp confederation identifier 65500
  bgp confederation peers 65511
  neighbor lo(Spine#1) remote-as 65511
  bgp confederation peers 65512
  neighbor lo(Spine#2) remote-as 65512 router bgp 65500
  neighbor lo(Leaf#2) remote-as 65500
  .
  .
  neighbor lo(Leaf#X) remote-as 65500
```

NETWORK SYSTEM AND CONFIGURATION METHOD THEREFOR

CROSS-REFERENCE TO RELATED APPLICATIONS

This application is a National Stage application under 35 U.S.C. § 371 of International Application No. PCT/JP2019/005087, having an International Filing Date of Feb. 13, 2019, which claims priority to Japanese Application Serial No. 2018-024147, filed on Feb. 14, 2018. The disclosure of the prior application is considered part of the disclosure of this application, and is incorporated in its entirety into this application.

TECHNICAL FIELD

The present invention relates to a network system and a configuration method thereof.

BACKGROUND ART

With spread of cloud services in recent years, network traffics are rapidly increasing in large-scale data centers. In such large-scale data centers, a network design in which BGP (Border Gateway Protocol) peers are created using a highly scalable Clos topology network to realize routing is used in inter-cluster connection (see NPL 1).

Here, a configuration of the Clos topology network will be described with reference to FIG. 7.

The Clos topology network in FIG. 7 has a two-stage configuration including a plurality of spine switches of Spine#1 and Spine#2 and a plurality of leaf switches of Leaf#1, Leaf#2, . . . , and Leaf#x and has a connection configuration in which all spine switches and all leaf switches are connected directly. BGP peers indicated by broken lines in FIG. 7 are created between all spine switches and all leaf switches With this network configuration, a large-scale data center is realized.

In the Clos topology network, by increasing the number of leaf switches and spine switches, traffic scaling can be easily performed. Moreover, since switching capacity can be improved when the number of spine switches is increased, it is easy to expand of data centers.

BGP used in the network of FIG. 7 has characteristics that it has a plenty of operation records in the Internet backbone, many commercially-available L3-network relay devices have been implemented, it has a simpler protocol design (only sessions are attached to TCP (Transmission Control Protocol)) than IGP (Interior Gateway Protocol) such as OSPF (Open Shortest Path First) , and communication bypass control during failures and maintenance is easy.

CITATION LIST

Non Patent Literature

[NPL 1] RFC7938, "Use of BGP for Routing in Large-Scale Data Centers", [online], August 2016, [retrieved on Jan. 16, 2018], Internet <URL: https://tools.ietf.org/html/rfc7938>

SUMMARY OF THE INVENTION

Technical Problem

However, in an enterprise network, bases at remote sites are connected to an IP-VPN (Internet Protocol Virtual Private Network) to construct a network between the bases.

The IP-VPN network can be formed by a Clos topology network in FIG. 7. In this case, a PE router (Provider Edge router) of the IP-VPN network corresponds to a leaf switch of the Clos topology network, and a P router (Provider Router) corresponds to a spine switch.

In the IP-VPN network, path information is exchanged using BGP (specifically, eBGP (External Border Gateway Protocol)) and the Clos topology network can be applied to the IP-VPN network However, in the Clos topology network, since path information is advertised to both overlay and underlay using eBGP, an overlay VPN path is advertised from leaf switches to spine switches, which serves as a processing load of the path information of leaf switches and spine switches.

Particularly, in the Clos topology network, since the traffic of all leaf switches in the network concentrates on one spine switch, all spine switches each have the VPN path information of all leaf switches.

Therefore, as the scale of the Clos topology network increases, the processing load of the VPN path information of leaf switches and spine switches increases.

An object of the present invention is to provide a network system in which a network relay device which reduces the load of VPN path information is connected to a Clos topology and a configuration method thereof.

Means for Solving the Problem

In order to solve the problems, a network system according to claim 1 a network system in which a plurality of network relay devices which are routers or switches are connected by a leaf/spine type Clos topology and which performs path control using BGP, wherein each of the plurality of network relay devices belongs to an entire AS made up of all of the plurality of network relay devices by BGP confederation and the respective network relay devices belong to a sub AS, and one leaf type network relay device is connected to a spine type network relay device via an eiBGP peer and is connected to the other leaf type network relay devices via an iBGP peer.

A configuration method of a network system according to claim 5 is a configuration method of a network system in which a plurality of network relay devices which are routers or switches are connected by a leaf/spine type Clos topology and which performs path control using BGP, the configuration method including: allowing each of the plurality of network relay devices to belong to an entire AS made up of all of the plurality of network relay devices by BGP confederation and. allow ing the respective network relay devices to belong to a sub AS; allowing one spine type network relay device to be connected to a leaf type network relay device via an eiBGP peer; and allowing one leaf type network relay device to be connected to a spine type network relay device via an eiBGP peer and allowing the same to be connected to the other leaf type network relay devices via an iBGP peer.

By doing so, since path information is not advertised to the spine type network relay device, it is possible to reduce the processing load of the path information in the entire network and to improve the network throughput.

A network system according to claim 2 is the network system according to claim 1 in which the network relay device compares an AS number of a subject device with an AS number of a destination device and transmits an OPEN message in which a sub AS to which the subject device belongs is described as a belonging AS to the destination. device when the AS numbers are different.

A configuration method of a network system according to claim 6 is the configuration method of the network system according to claim 5, further including allowing the network relay device to compare an AS number of a subject device with an AS number of a destination device and to transmit an OPEN message in which a sub AS to which the subject device belongs is described as a belonging AS to the destination device when the AS numbers are different.

By doing so, it is possible to reduce the processing load of the path information in the entire network and to improve the network throughput.

A network system according to claim 3 is the network system according to claim 1, in which the network relay device determines presence of BGP peers to the same destination device in belonging ASs having different BGP setting and commits the BGP setting.

A configuration method of a network system according to claim 7 is the configuration method of the network system according to claim 5, further comprising allowing the network relay device to determine presence of BGP peers to the same destination device in belonging ASs having different BGP setting and to commit the BGP setting.

By doing so, since the consistency of BGP setting is checked and the BGP setting is committed (determined), it is possible to prevent malfunctioning of the network system resulting from incorrect setting of the configuration information.

A network system according to claim 4 is the network system according to claim 1, in which the network relay device has a connection priority of a BGP peer for each belonging AS and connects BGP peers sequentially according to predetermined rules on the basis of a belonging AS number and the connection priority.

A configuration method of a network system according to claim 8 is the configuration method of the network system according to claim 5, further comprising allowing the network relay device to have a connection priority of a BGP peer for each belonging AS and to connect BGP peers sequentially according to predetermined rules on the basis of a belonging AS number and the connection priority.

By doing so, since it is possible to prevent occurrence of an unreachable error of iBGP peers, it is possible to suppress an unnecessary session processing load from being applied to respective switches.

Effects of the Invention

According to the present invention, since VPN path information is not advertised to spine switches in a network system of a Clos topology, it is possible to reduce the processing load of the path information of an entire network and to improve a network throughput.

BRIEF DESCRIPTION OF DRAWINGS

FIG. 2 is a diagram illustrating a BGP setting command of a Leaf#1 switch.

DESCRIPTION OF EMBODIMENTS

Hereinafter, a network system 1 according to an embodiment will be described in detail with reference to the drawings.

Figure 1:
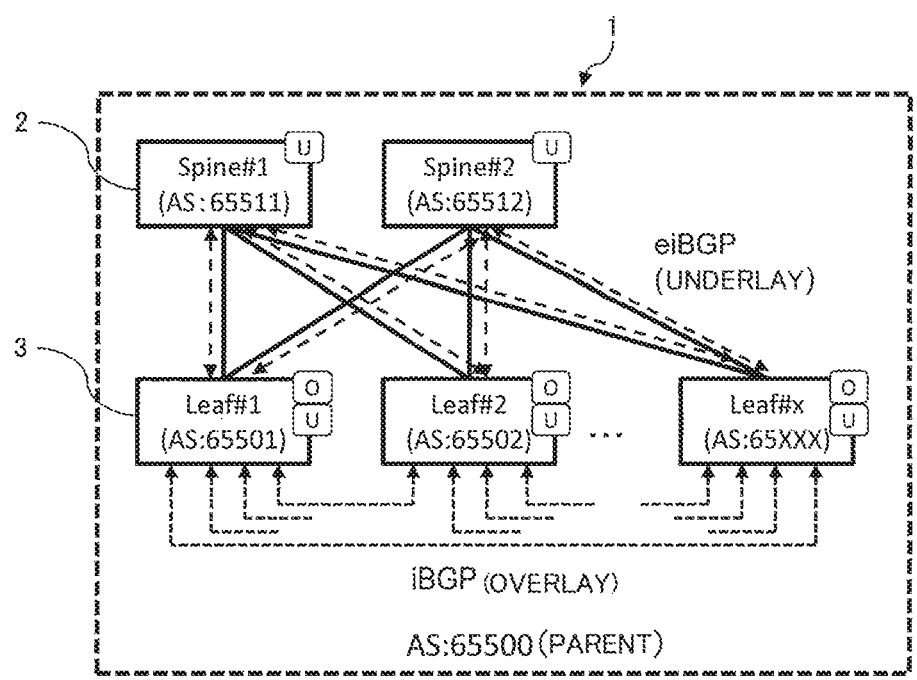
FIG. 1 is a diagram for describing a connection configuration of a network system according to an embodiment.

FIG. 1 is a diagram for describing a connection configuration of the network system 1 of a Clos topology that forms an IP-VPN network.

In FIG. 1, Spine#1 and Spine#2 are spine switches 2 corresponding to a P router of an IP-VPN network, and Leaf#1, Leaf#2, . . . , and Leaf#x are leaf switches 3 corresponding to a PE router.

As illustrated in FIG. 1, an AS number indicating a management unit of an autonomous system (AS) that performs path control using BGP is allocated to each of the spine switches 2 and the leaf switches 3 of the network system of the embodiment.

Furthermore, in the network system 1 of the embodiment, a BGP confederation is introduced, the network system of the embodiment is defined as one AS (hereinafter an entire AS), and 65500 is allocated to the AS number (AS: 65500 in FIG. 1).

In the network system 1 of the embodiment, an MP-BGP (Multi Protocol BGP) is used between PE routers (the leaf switches 3) in the IP-VPN in order to exchange path information.

Assuming that all spine switches 2 and leaf switches 3 are ASs (sub ASs) finely subdivided in the entire AS by BGP confederation, eiBGP sessions are created.

A full-mesh of iBGP sessions are created between the plurality of leaf switches 3 as a device group belonging to the entire AS.

That is, the leaf switches 3 of the network system of the embodiment belong to a plurality of ASs (a parent AS and a sub AS) and eiBGP and iBGP sessions are separated according to the respective AS policies.

By connecting the network system 1 of the embodiment using BGP as described above to narrow an advertisement range of a VPN path to the leaf switches 3 only, it is possible to reduce the path load of the spine switches 2.

More specifically, the path information in the entire AS is advertised in the spine switches 2 and the leaf switches 3 in which the entire AS is defined, and each of the spine switches 2 and the leaf switches 3 retains the path information as underlay path information.

The leaf switch 3 retains the path information of a CE router (Customer Edge router) to be connected thereto as a PE router in its routing table. iBGP sessions (iBGP peers) are created between the leaf switches 3 whereby overlay VPN path information is advertised by the iBGP peers.

That is, since the leaf switch 3 retains both the path information (a rectangular frame O in FIG. 1) of an overlay network (IP-VPN) and. the path information (a rectangular frame U in FIG. 1) of an underlay network whereas the spine switch 2 only needs to retain the path information (the rectangular frame U in FIG. 1) of an underlay network, it is possible to reduce the path load of the spine switch 2.

In VPN connection via Leaf#1 and Leaf#2 in the network system 1 of the embodiment of FIG. 1, although there is no direct connection between Leaf#1 and Leaf#2 of the iBGP peers, the VPN connection is naturally performed by an underlay network via Spine#1 or Spine#2.

In this case, it is assumed that the path information of the spine switch is determined in advance.

Next, a method of setting a network relay device such as the spine switch 2 and the leaf switch 3 in the BGP function will be described.

FIG. 2 is a diagram illustrating a BGP setting command of the leaf switch of Leaf#1 that belongs to a plurality of ASs (a parent AS and a sub AS) and separates eiBGP and iBGP sessions according to the respective AS policies. The Leaf#1 switch performs BGP setting according to the setting command as configuration information for each peer.

The first line of the command image of FIG. 2 is a command for operating BGP of Leaf#1 of which the belonging AS number is 65501 to enter a setting mode.

The second line is a line for setting a BGP confederation and sets an entire AS which is a parent AS to which Leaf#1 belongs.

The third and fourth lines set Spine#1 to be peered inside the BGP confederation. More specifically, the third line sets 65511 as a belonging AS number to specify Spine#1. A neighbor command on the fourth line explicitly set an 10 address of Spine#1 to be used as a BGP peer.

The fifth and sixth lines set Spine#2 that is peered inside the BGP confederation.

The seventh and subsequent lines set to create a full-mesh of iBGP peer sessions between a plurality of leaf switches as a network relay device group belonging to the entire AS (the parent AS).

Specifically, frst, the seventh line issues a command for operating the BGP of the entire AS of which the belonging AS number is 65500 to enter a setting mode. Moreover, the eighth and subsequent lines set IP addresses of Leaf#2 to Leaf#x connecting to Leaf#1 in a full-mesh of BGP peers as the IP address of the entire AS.

In this way, the Leaf#1 switch of the network system of the embodiment can belong to a plurality of ASs (the parent AS and the sub AS) and can separate the eiBGP and iBGP sessions according to the respective AS policies.

For example, the Leaf#1 switch sets 65501 as a subject AS number of an OPEN message for an eiBGP peer with the Spine#1 switch.

Moreover, the Leaf#1 switch sets 65500 as a subject AS number of an OPEN message for an iBGP peer with the Leaf#2 switch.

FIG. 2 is a diagram illustrating the BGP setting command of the Leaf#1 switch, and similar settings are performed with respect to the Leaf#2 to Leaf#x switches.

The commands corresponding to the first and second lines of FIG. 2 are described for Spine#1 or Spine#2, and the third and subsequent lines set the Leaf#1 to Leaf#x switches connected to Spine#1 and Spine#2 to be peered inside the BGP confederation and explicitly set an IP address to be used as a BGP peer.

In this way, it ispossible to create eiBGP peers between all spine switches and leaf switches.

Next, a method for controlling a network relay device functioning as a spine switch or a leaf switch constructing the network system of the embodiment with the command illustrated in FIG. 2 will be described.

A control flow to be described below is implemented as a control program of a network relay device.

Figure 3:
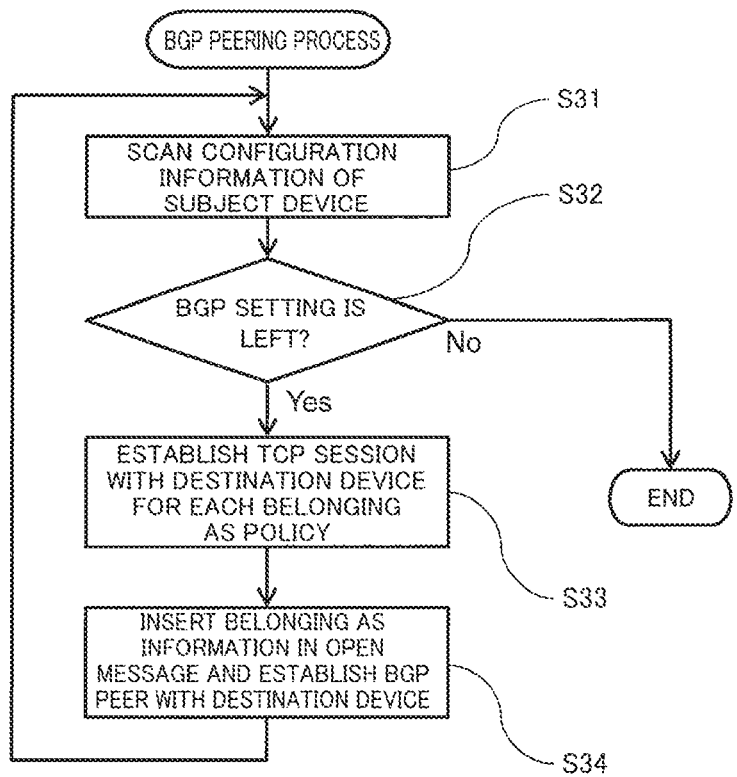
FIG. 3 is a diagram illustrating a part of the flow of a BGP peering process of a leaf switch.

FIG. 3 is a diagram illustrating a part of the flow of a BGP peering process for leaf switches in which configuration information is set for each peer using the BGP setting command described in FIG. 2. A similar process flow is performed for spine switches.

A leaf switch scans configuration information of a subject device in step S31 and determines whether BGP setting for a connecting peer set for each belonging AS policy is left (S32).

When the BGP setting is left in step S32 (S32: Yes), the flow proceeds to step S33. When the BGP setting is not left (S32: No), the BGP peering process ends.

In step S33, the leaf switch establishes a TCP session with a destination device on the basis of one BGP setting among the BGP settings of the respective belonging AS policies processed. sequentially. In this case, it is assumed that the subject device and the destination device have IP reachabili ty.

Subsequently, in step S34, the leaf switch inserts AS information to which the subject device and the destination device belong in a belonging AS field of an OPEN message and exchanges the OPEN message to establish. BGP peers.

Returning to step S31, the processes of steps S33 and S34 are performed until the BGP setting is not left.

With the above-described process, a network relay device such as a spine switch or a leaf switch. set on. the basis of a setting command can connect BOP peers on the basis of a plurality of AS policies using configuration information that stores the BGP setting of each belonging AS policy.

Next, a process when a confederation is formed between a spine switch and a leaf switch to establish. BGP peers between sub ASs to create eiBGP sessions will be described with reference to FIG. 4.

Figure 4:
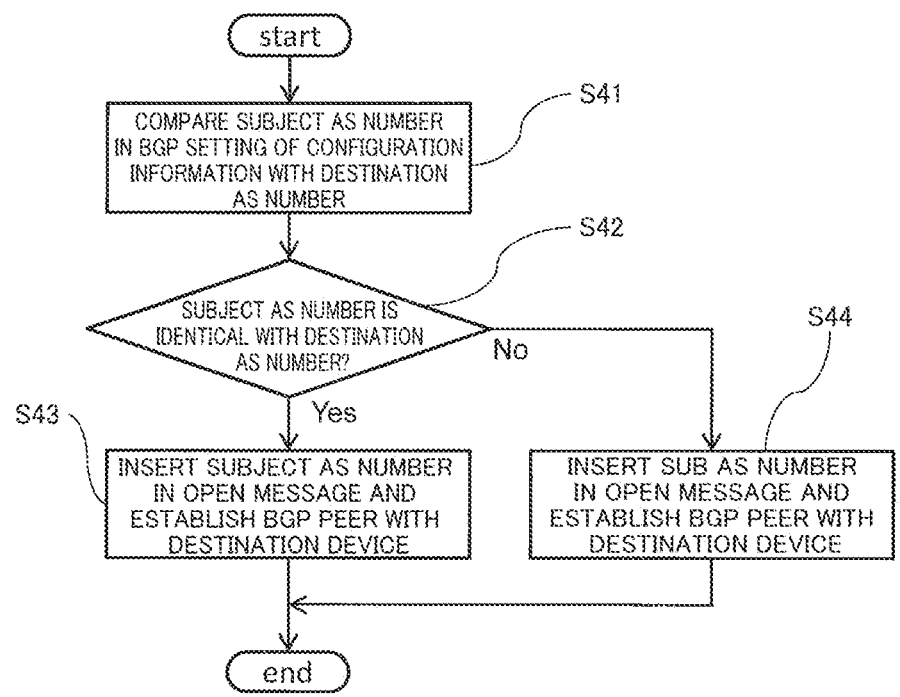
FIG. 4 is a flowchart illustrating the process of step S34 in detail.

FIG. 4 is a flowchart illustrating the process of step S34 in FIG. 3 in detail.

First, in step S41, the spine switch or the leaf switch compares the subject AS number and the destination AS number in the BGP setting of the configuration information.

When the subject AS number and the destination AS number are identical (S42: Yes), the subject AS number is inserted in the OPEN message to create a BGP peer with the destination device and a connection is established (S43). After that, the process ends.

When the subject AS number and the destination AS number are not identical (S42: No), although a parent AS number is inserted in the OPEN message in the case of normal confederation, a sub AS number is inserted in the OPEN message to create a BOP peer with the destination device and a connection is established (S44). After that, the process ends.

In this way, when the AS number of the subject device is different from the AS number of the destination device, an OPEN message in which a sub AS to which the subject device belongs rather than the parent AS of the confederation is described as a belonging AS is transmitted to the destination device, and an eiBGP session is created between sub ASs.

In the network system of the embodiment, setting of the network relay device such as a spine switch or a leaf switch is performed using the BGP setting command as illustrated in FIG. 2. Therefore, there is a possibility that incorrect setting may be performed accidentally.

For example, when a BGP sessio policy belonging to a plurality of ASs is set, setting to create a session to the same destination device may be described in the BGP settings of different AS policies.

Therefore, in the network system of the embodiment, the consistency of BGP setting is checked to commit (determine) the BGP setting.

Figure 5:
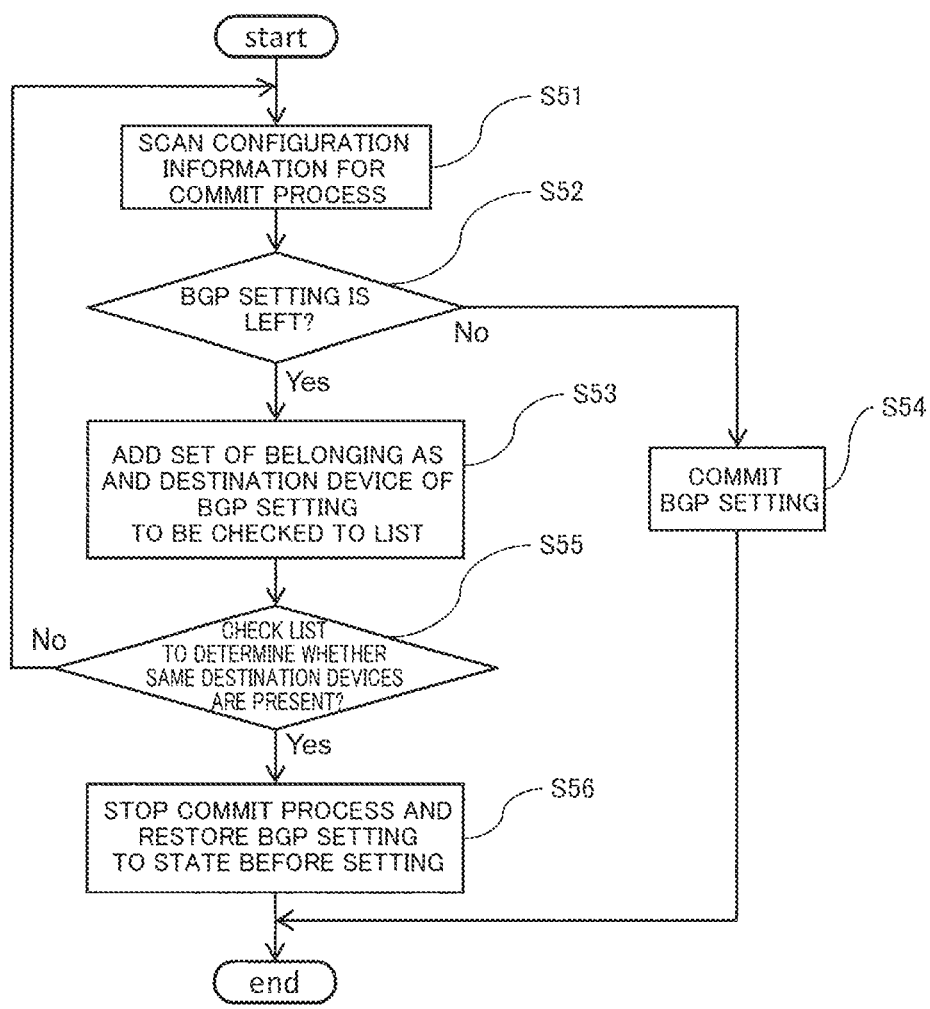
FIG. 5 is a flowchart of a process of committing BGP setting.

A process flow of committing BGP setting will be described with reference to FIG. 5.

First, the spine switch or the leaf switch scans configuration information in step S51 for a commit process to determine whether BGP setting is left (S52).

In step S52, when the BGP setting is left (S52: Yes), the flow proceeds to step S53. When the BGP setting is not left (S52: No), the BGP setting is committed (S54) assuming that there is no abnormality in consistency, and the process ends.

In step S53, a set of the belonging AS and the destination device of the BGP setting to be checked is added to a list. The list is checked to determine whether the same set of destination devices is present in. a different. belonging AS (S55).

In step S55, when the same set of destination devices is not present (S55: No), the flow returns to step S51, and the checking process is continued. When the same set of destination devices is present (S55: Yes), the flow flows to step S56 assuming that the consistency of the BGP setting is not correct.

In step S56, the BGP setting commit process is stopped, and the BGP setting is restored to the BGP setting before the setting according to the command, and the process ends. In this case, a warning indicating the consistency of the BGP setting was not correct may be displayed.

In this way, it is possible to prevent malfunctioning of the network system resulting from incorrect setting of the configuration information.

Subsequently, in the network system of the embodiment, overlay leaf switches are connected by iBGP peers during construction of BGP peers. However, when iBGP peers are created between leaf switches in a state in which an eiBGP peer (underlay) session between the spine switch and the leaf switch is not completed, an unreachable error occurs, and the connection process is repeated. In this way, there is a possibility that an unnecessary session processing load may be applied to respective switches.

In the network system of the embodiment, a priority of a session connection command in a BGP peering process is provided to the BGP setting based on the belonging AS policies when the spine switch or the leaf switch belongs to a plurality of ASs.

The details of the BGP peering process will be described with reference to the process flow of FIG. 6.

Figure 6:
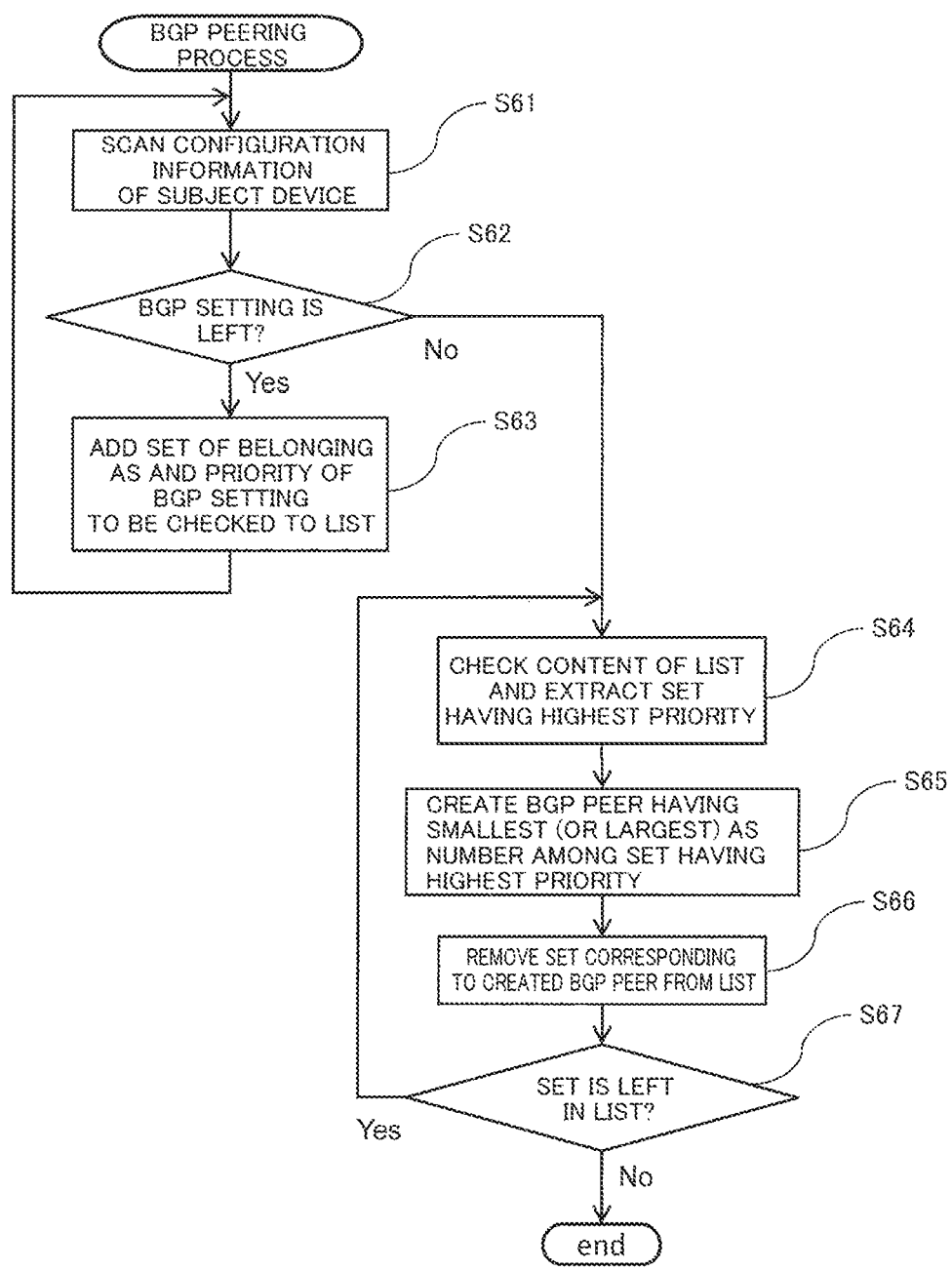
FIG. 6 is a flowchart for describing the details of a BGP peering process.
Figure 7:
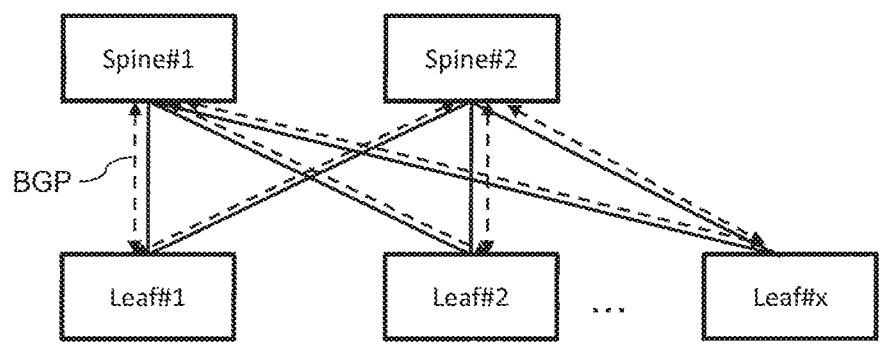
FIG. 7 is a diagram for describing a configuration of a Clos topology network.

A session connection priority for each AS is recorded in advance in the configuration information referred to in the process flow of FIG. 6.

First, the spine switch or the leaf switch scans the configuration information in step S61 for a BGP peer connection process and determines whether a BGP setting to be checked is left (S62).

In step S62, when the BGP setting is not left (S62: No), the flow proceeds to step S64. When the BGP setting is left (S62: Yes), a set of a priority and a belonging AS of the BGP setting to be checked is added to a list. After that, the flow returns to step S61, and the process of step S63 is repeated until the BGP setting to be checked is not left.

With steps S61 to S63, first, a list of connection peers made up of the set of a session connection priority and the belonging AS of the subject device is created. Moreover, by the processes to be described later, connection of a BGP peer specified by predetermined rules is performed on the basis of the priority and the AS number.

In step S64, the spine switch or the leaf switch checks the content of the list and extracts a set having the highest priority. In step S65, a BGP peer is created for a connection peer having the smallest (or the largest) AS number among the set of connection peers extracted in step S64.

When the BGP peer is established in step S65, the set corresponding to the created BGP peer is removed from the list (S66), and it is determined whether a set is left in the list (S67).

In step S67, when a set is left in the list (S67: Yes), the flow returns to step S64 and the process is repeated. When the set is not left in the list (S67: No), the BGP peering process ends.

In the network system of the embodiment, a connection priority of an eiBGP peer between an underlay leaf switch and an underlay spine switch is set to be higher than the connection priority of an iBGP peer between overlay leaf switches. In this way, during connection of the iBGP peer between the overlay leaf switches, the eiBGP peer is established between the underlay leaf switch and the underlay spine switch. Therefore, it is possible to prevent. occurrence of an unreachable error of the iBGP peer.

According to the network system of the embodiment, in the network system of the Clos topology, it is possible to reduce a path load of a spine switch, prevent inconsistency in network construction, and prevent an unnecessary BGP peer session error.

REFERENCE SIGNS LIST

1 Network system
2 Spine switch
3 Leaf switch

The invention claimed is:

1. A network system comprising:
a plurality of network relay devices that are connected by a leaf/spine type Clos topology, configured to perform path control using a border gateway protocol (BGP), and belong to an autonomous system (AS) made up of all of the plurality of network relay devices by BGP confederation, wherein
each of the plurality of network relay devices comprises a router or a switch and belongs to a respective sub AS, and
one leaf type network relay device of the plurality of network relay devices is connected to a spine type network relay device of the plurality of network relay devices via a first BGP peer and is connected to other leaf type network relay devices of the plurality of network relay devices via a second BGP peer; wherein
each of one or more of the plurality of network relay devices is configured to compare an AS number of a subject device of the plurality of network relay devices with an AS number of a destination device of the plurality of network relay devices and transmit, to the destination device when the AS numbers are different, a message in which a sub AS to which the subject device belongs is described as a belonging AS; and
each of the one or more of the plurality of network relay devices has a connection priority of a BGP peer for each belonging AS and connects BGP peers sequentially according to predetermined rules based on a belonging AS number and the connection priority.

2. The network system according to claim 1, wherein each of one or more of the plurality of network relay devices is configured to determine a BGP setting based on a presence of BGP peers to the same destination device in belonging ASs having different BGP settings.

3. A configuration method of a network system comprising a plurality of network relay devices that are connected by a leaf/spine type Clos topology, configured to perform path control using a border gateway protocol (BGP), and each comprises a router or a switch, the configuration method comprising:
  allowing the plurality of network relay devices to belong to an autonomous system (AS) made up of all of the plurality of network relay devices by BGP confederation and allowing each of the plurality of network relay devices to belong to a respective sub AS;
  allowing one spine type network relay device of the plurality of network relay devices to be connected to a leaf type network relay device of the plurality of network relay devices via a first BGP peer;
  allowing one leaf type network relay device of the plurality of network relay devices to be connected to other leaf type network relay devices of the plurality of network relay devices via a second BGP peer;
  allowing each of the one or more of the plurality of network relay devices to compare an AS number of a subject device of the plurality of network relay devices with an AS number of a destination device of the plurality of network relay devices and to transmit, to the destination device when the AS numbers are different, a message in which a sub AS to which the subject device belongs is described as a belonging AS; and
  allowing each of one or more of the plurality of network relay devices to have a connection priority of a BGP peer for each belonging AS and to connect BGP peers sequentially according to predetermined rules based on belonging AS number and the connection priority.

4. The configuration method of the network system according to claim 3, further comprising allowing each of one or more of the plurality of network relay devices to determine a BGP setting based on a presence of BGP peers to the same destination device in belonging ASs having different BGP settings.

5. A non-transitory computer readable medium storing instructions that when executed by a computer cause the computer to perform a configuration method of a network system, the network system comprising a plurality of network relay devices that are connected by a leaf/spine type Clos topology, configured to perform path control using a border gateway protocol (BGP), and each comprises a router or a switch, wherein the configuration method comprises:
  allowing the plurality of network relay devices to belong to an autonomous system (AS) made up of all of the plurality of network relay devices by BGP confederation and allowing each of the plurality of network relay devices to belong to a respective sub AS;
  allowing one spine type network relay device of the plurality of network relay devices to be connected to a leaf type network relay device of the plurality of network relay devices via a first BGP peer;
  allowing one leaf type network relay device of the plurality of network relay devices to be connected to other leaf type network relay devices of the plurality of network relay devices via an iBGP a second BGP peer
  allowing each of the one or more of the plurality of network relay devices to compare an AS number of a subject device of the plurality of network relay devices with an AS number of a destination device of the plurality of network relay devices and to transmit, to the destination device when the AS numbers are different, a message in which a sub AS to which the subject device belongs is described as a belonging AS; and
  allowing each of one or more of the plurality of network relay devices to have a connection priority of a BGP peer for each belonging AS and to connect BGP peers sequentially according to predetermined rules based on belonging AS number and the connection priority.

6. The non-transitory computer readable medium according to claim 5, further comprising allowing each of one or more of the plurality of network relay devices to determine a BGP setting based on a presence of BGP peers to the same destination device in belonging ASs having different BGP settings.

* * * * *